US011918535B2

(12) United States Patent
Decastro et al.

(10) Patent No.: US 11,918,535 B2
(45) Date of Patent: Mar. 5, 2024

(54) WEARABLE EXOSKELETON

(71) Applicant: TOYOTA RESEARCH INSTITUTE, INC., Los Altos, CA (US)

(72) Inventors: Jonathan Decastro, Arlington, MA (US); Soon Ho Kong, Arlington, MA (US); Nikos Arechiga Gonzalez, San Mateo, CA (US); Frank Permenter, Cambridge, MA (US); Dennis Park, Fremont, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 496 days.

(21) Appl. No.: 16/847,380

(22) Filed: Apr. 13, 2020

(65) Prior Publication Data
US 2021/0315764 A1  Oct. 14, 2021

(51) Int. Cl.
*A61H 3/00* (2006.01)
(52) U.S. Cl.
CPC ....... *A61H 3/00* (2013.01); *A61H 2201/0103* (2013.01); *A61H 2201/0173* (2013.01); *A61H 2201/165* (2013.01); *A61H 2201/1659* (2013.01); *A61H 2201/5007* (2013.01); *A61H 2230/625* (2013.01)
(58) Field of Classification Search
CPC .............. A61H 3/00; A61H 2201/0103; A61H 2201/0173; A61H 2201/165; A61H 2201/1659; A61H 2201/5007; A61H 2230/625
See application file for complete search history.

(56) References Cited

U.S. PATENT DOCUMENTS

| | | | |
|---|---|---|---|
| 9,600,995 B2 | 3/2017 | Gaidar et al. | |
| 2013/0261513 A1 | 10/2013 | Goffer et al. | |
| 2014/0171838 A1* | 6/2014 | Aleksov | A61H 3/00 601/33 |
| 2015/0025423 A1* | 1/2015 | Caires | B25J 9/1615 601/35 |
| 2015/0101112 A1 | 4/2015 | Balbien et al. | |
| 2016/0030201 A1* | 2/2016 | Zoss | A61H 3/00 623/24 |
| 2016/0030272 A1* | 2/2016 | Angold | A61F 2/70 623/24 |
| 2016/0213072 A1 | 7/2016 | Chung | |
| 2018/0325776 A1* | 11/2018 | Gitman | A61J 1/16 |
| 2019/0070059 A1* | 3/2019 | Dalley | B25J 9/1615 |
| 2019/0314977 A1* | 10/2019 | Kanaya | B25J 11/008 |
| 2020/0179217 A1* | 6/2020 | Aprigliano | A61H 3/00 |
| 2021/0210202 A1* | 7/2021 | Awiszus | G05B 19/0428 |
| 2021/0298984 A1* | 9/2021 | Bulea | A61H 1/0237 |

FOREIGN PATENT DOCUMENTS

| | | |
|---|---|---|
| WO | 2014002092 A1 | 1/2014 |
| WO | 2017146571 A1 | 8/2017 |
| WO | 2018127506 A1 | 7/2018 |

* cited by examiner

*Primary Examiner* — Jerrah Edwards
*Assistant Examiner* — Aren Patel
(74) *Attorney, Agent, or Firm* — SEYFARTH SHAW LLP

(57) ABSTRACT

Systems and methods for a powered, robotic exoskeleton, or exosuit, for a user's limbs and body are provided. The exosuit may be equipped with airbag devices mounted at various locations on the suit. The exosuit may include on-board computing equipment that can sense, compute control commands in real-time, and actuate limbs and airbags to restore stability (fall prevention) and minimize injuries due to falls, should they happen (fall protection).

14 Claims, 5 Drawing Sheets

WEARABLE EXOSKELETON

FIELD OF TECHNOLOGY

The present disclosure relates to a system and method for preventing injury during a fall, more particularly to a wearable exoskeleton that may prevent a fall or reduce potential injuries of the wearer.

BACKGROUND

Injuries from falls often occur to the extremities of the person falling, such as the hands and wrists, due to the person's instinctual movements to brace themselves from the fall. When falling backwards or forwards, a person involuntarily may extend their arms hoping to lessen the impact of the ground and thus prevent injury to their face, head or other body part. Unfortunately, those extremities are prone to severe injury in such instances, perhaps even greater injury than if the falling person fell on their chest, back, or posterior. The chest, back and posterior may be able to absorb more impact of the fall, with less chance of injury, than the hands or wrists.

Powered exoskeletons are essentially wearable robots that aid the mobility of elderly people, allowing them to lift items, climb stairs, prevent injuries, and otherwise move around with as little impact and strain on their joints as possible. They also may be useful as an augmentation device for warehouse, factory, and construction workers, with some giving a human the ability to easily lift 200 lbs. Regardless of whether an elderly person or construction worker is wearing the exoskeleton, there is an important demand for safety.

Exoskeletons may offer a unique opportunity for keeping people safe. "Safe" may include prevention of falls, maintaining stability of the wearer, limiting joint loading, or the like. There has been much work in this direction, most of which focuses on performance enhancement.

SUMMARY

Aspects of the present disclosure provide systems and methods for a powered exoskeleton, or exosuit, for a user's limbs and body. The exosuit also may be equipped with airbag devices mounted at various locations on the suit. The exosuit may include on-board computing equipment that can sense, compute control commands in real-time, and actuate limbs and airbags to restore stability (fall prevention) and minimize injuries due to falls, should they happen (fall protection).

According to one aspect, a wearable device is provided, the wearable device may include a frame and at least one robotic joint operatively coupled to the frame. At least one sensor may be coupled to the frame. The sensor may be configured to sense a movement of the frame. A controller may be coupled to the at least one robotic joint and the at least one sensor. The controller may be configured to detect an event from the movement of the frame and actuate the at least one robotic joint in response to the event.

According to another aspect of the present disclosure, a method of countering a fall by a user is provided. A user profile including one or more user preferences may be loaded. A movement event may be sensed by a sensor coupled to a frame. The movement event may be classified according to data obtained from the sensor. A robotic joint coupled to the frame may be actuated in response to the event based on the classification and the user profile.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide for an exosuit adapted and configured to keep a wearer or user safe. "Safe" in the context of the present disclosure may include, without limitation, prevention of falls, maintaining stability of the wearer, limiting joint loading, or the like. While much work in this direction has focused on performance enhancement, aspects of the present disclosure include a system and method for preventing a fall or injury from a fall of the user.

As described herein, a user, perhaps an elderly person, may be equipped with a powered exosuit adapted to fit to the user's limbs. According to one aspect, the exosuit may be equipped with airbag devices mounted at various locations on the suit. The exosuit, as described herein, may include on-board computing equipment that can sense, compute control commands in real-time, and actuate limbs and airbags to restore stability, i.e., fall prevention, and minimize injuries due to falls, should they happen, i.e., fall protection.

For instance, if the user trips or slips on a wet floor, causing them to fall forward, the system may attempt to keep the person on their feet by actuating the legs or adjusting the center of mass backwards. If this fails, then an airbag on the chest may deploy and the forearms may be moved out of the way of the fall. The amount of force acting on the limbs of the person will be adjusted according to the person's age, medical conditions, or the like. The exosuit may also be able to deploy small airbags and place the arms in a location that will protect the user and help the user, especially if elderly, to get up unassisted. The exosuit may also include software and hardware able to communicate with a health care provider to notify the provider of a fall or potential injury.

Figure 1:
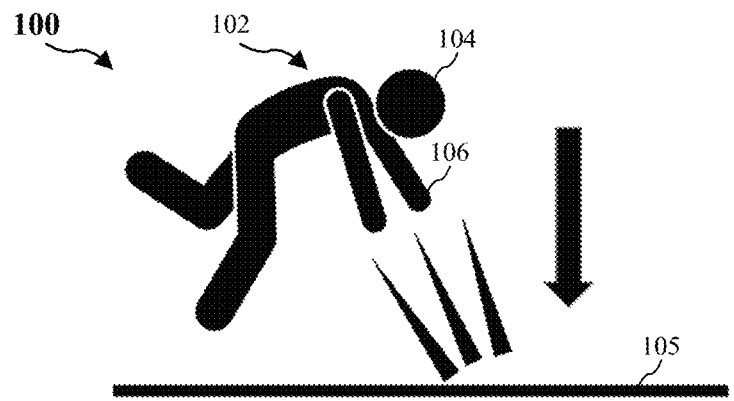
FIG. 1 is an illustration of a falling person according to one aspect of the present disclosure.

FIG. 1 depicts a conceptual illustration 100 of a falling person 102 according to one aspect of the present disclosure. When a person 102 falls forward, due to a loss of balance, slipping on ice or some other surface, the person 102 may instinctually and involuntarily extend their arms and hands 106 to brace themselves from the impact against the ground 105 or some other surface. The person 102 may instinctually act to use their arms, wrists and hands 106 to absorb the impact to reduce or prevent the person's head 104 from striking the ground 105. Similarly, if a person 102 were to fall backwards, the person 102 may extend their arms, wrists and hands 106 behind them to brace themselves and absorb the impact with the ground 105, perhaps to avoid impacting their head, back or posterior with the ground 105.

Unfortunately, the arms, wrists, and hands, particularly in the elderly, are poor impact absorbers and can often be severely injured, often preventing the falling person from being able to get up after the fall. Aspects of the present disclosure provide for a wearable exosuit that ideally may prevent the fall in the first instance, but also may articulate the wearer's body, including limbs such as the arms, wrist, hands, neck, and the like into positions that may minimize injury from the fall.

Figure 2:
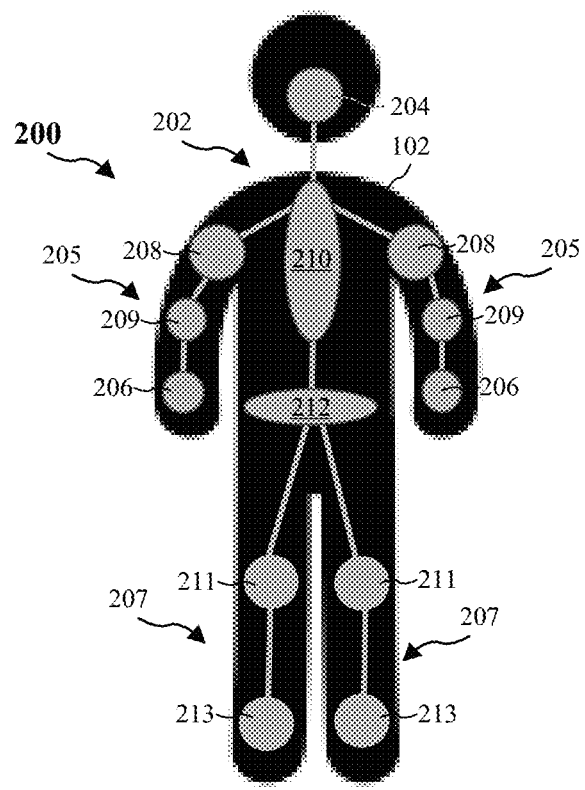
FIG. 2 is a conceptual illustration of a user wearing an exosuit according to one aspect of the present disclosure.

FIG. 2 is a conceptual illustration 200 of a person 102 wearing an exosuit 202 according to one aspect of the present disclosure. According to one aspect, the exosuit 202 may include a wearable suit or device with articulating upper limbs 205 and lower articulating limbs 207. The articulating upper limbs 205 may include shoulder joints 208, elbow joints 209, and wrist joints 206 operatively coupled to a core unit 210 and waist unit 212. The lower articulating limbs 207 may include knee joints 211 and ankle joints 213 operatively coupled to the core unit 210 and waist unit 212. Each of the joints of the exosuit 202 may be configured to align generally with the corresponding joints of the user. Each joint may include up to six degrees of freedom to allow for similar rotation and movement as the corresponding user's joints. The exosuit 202 may also include a head/neck unit 204 operatively coupled to the core unit 210.

According to one aspect, the exosuit 202 may include additional robotic structural and operational components including, without limitation, motors, servos, struts, braces and the like, as are known in the art. Such structural and operational components serve to articulate the exosuit physically according to the parameters and architecture discussed herein. For example, the exosuit may include structural and operational components configured to move, rotate, and otherwise position parts of the user's body to accomplish the fall prevention and protection architectures described in the present disclosure.

Figure 3A:
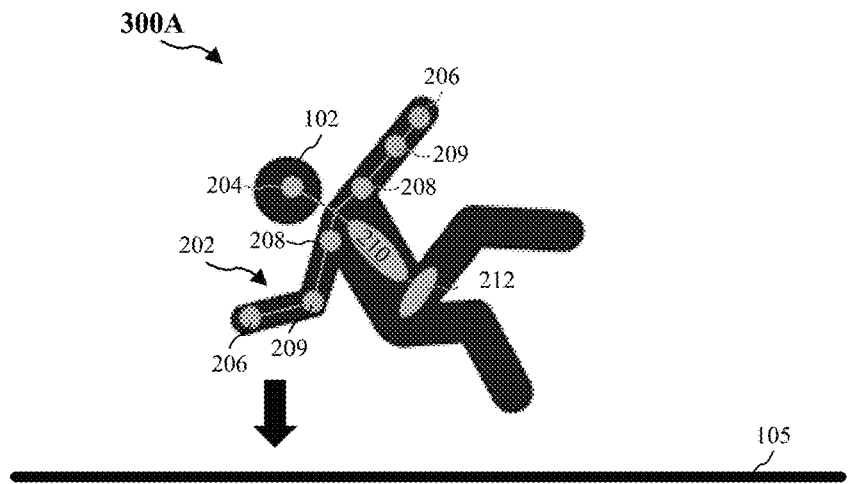
FIG. 3A is conceptual illustration of a falling user according to one aspect of the present disclosure.

FIG. 3A depicts a conceptual illustration 300A of a falling person 102 according to one aspect of the present disclosure. According to one aspect, for example, an elderly person 102 may wear the exosuit 202 for its assistive purposes, including enhancing mobility, preventing falls, or preventing injury. As depicted in FIG. 3A, the person 102 has begun to fall backward to the ground 105. The person 102 may instinctually extend their arm backwards and down towards the ground 105 in an effort to brace themselves or cushion themselves from the impact of the fall. Such movement, however, may pose a greater risk of injury to the hand, wrist, elbow or shoulder of the person 102.

Figure 3B:
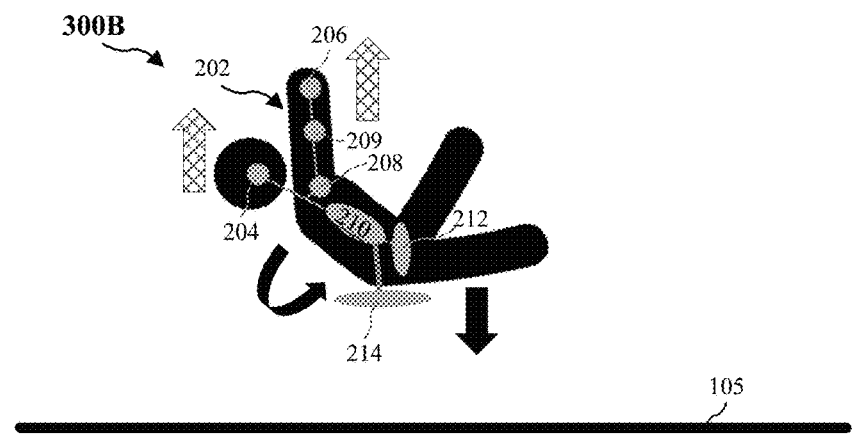
FIG. 3B is conceptual illustration of a falling user according to one aspect of the present disclosure.

According to one aspect, and as depicted in the conceptual illustration of FIG. 3B, the exosuit 202, upon sensing and detecting a fall, may act position the person 102 in a position designed to minimize injury. For example, the exosuit 202 may actuate the core unit 210 and the waist unit 212 to cause the user to rotate their hips so that the user's posterior will impact the ground 105 squarely, rather than the hip. Additionally, the exosuit 202 may articulate the user's arms upward or outward, preventing the use of the arm as a brace, and thus preventing an injurious impact to the hand, wrist, elbow, or shoulder. The head/neck unit 204 may also actuate to raise the user's head and neck, preventing or minimizing impact with the ground 105.

While the exosuit 202 has positioned the user such that the posterior of the user will bear the majority of the impact from the fall, more delicate and injury-prone body parts have been moved away from the impact zone. The user's posterior may include more fat and muscle tissue surrounding bones and joints, making that are of the body a more desirable part of the body to make impact with the ground.

According to one aspect, the exosuit may be outfitted with one or more airbags 214 that are deployed when a fall is sensed thereby proving a cushion between the user's body and the ground 105. While the illustration of FIG. 3B depicts a rearward fall onto the user's posterior, and therefore a deployment of an airbag 214 between the posterior and the ground 105, airbags may be disposed in any portion of the exosuit and around any portion of the user's body to be selectively deployed according to the sensed direction of the fall and potentially impacted parts of the user's body. For example, if the person 102 falls down a flight of stairs, the exosuit may prevent serious injury due to the fall by deploying one or more airbags before impact to soften the blow. According to one aspect, and as described herein, the exosuit may also timely actuate movement of the user's arms and legs during the fall to slow the rate of the fall and prevent injury to the head, spine, wrists, and the like.

Further, while the exosuit 202 of FIGS. 3A and 3B depict an exosuit controlling the upper body of the person 102, one of skill in the art will appreciate that the exosuit could be expanded to include the user's legs. The size and scope of coverage of the exosuit may depend on the user, their particular physical or health predispositions and other issues. The exosuit 202 as described herein may be adapted, maximized or minimize to cover and control any number of joints, extremities or other body parts of the user.

Figure 3C:
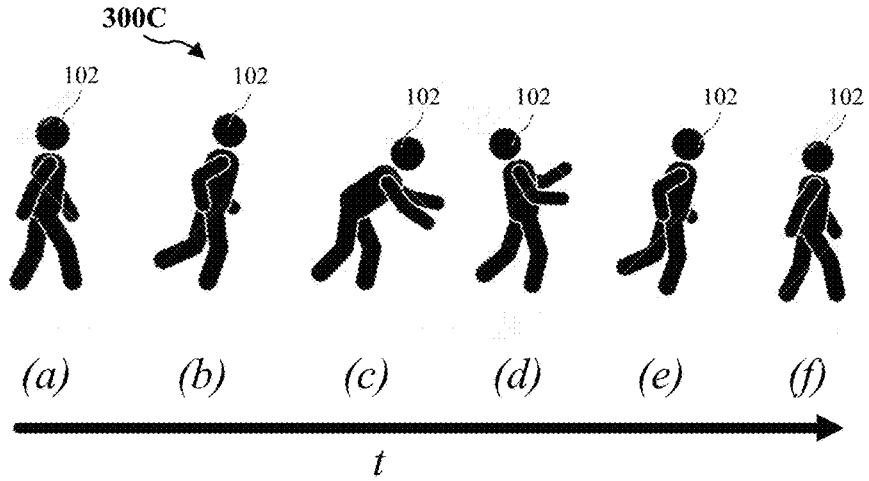
FIG. 3C is a conceptual illustration of a falling sequence according to one aspect of the present disclosure.

According to one aspect, the exosuit may be configured to assist in fall prevention, thus eliminating potential injury from a fall. FIG. 3C depicts a falling sequence 300C, over time, t, in which a person 102 begins to fall and upon the exosuit sensing a potential fall assists the person 102 to move its body in such a manner as to counter the fall and regain their balance. As depicted in FIG. 3C, at time (a) the user may be standing, walking, or otherwise moving normally. At time (b), the user may slip, lose their balance or otherwise begin to fall forward. At time (c), with the person 102 falling, the exosuit may react in an attempt to correct the fall and pull back from the fall. The exosuit 202 may shift the arms, hips, head or other operatively coupled body parts against the direction of the fall. At time (d), the exosuit may have caused the person 102 to return to a more up-right position by actuating the limbs, core unit, waist unit, and/or head/neck unit. At time (e), the exosuit may continue to actuate the user's body to counter the falling motion, or initial counter-falling motion, to re-establish the user's balance and equilibrium, shown at time (f). As such, the exosuit may prevent the person 102 from falling and thereby prevent any injury.

Figure 4:
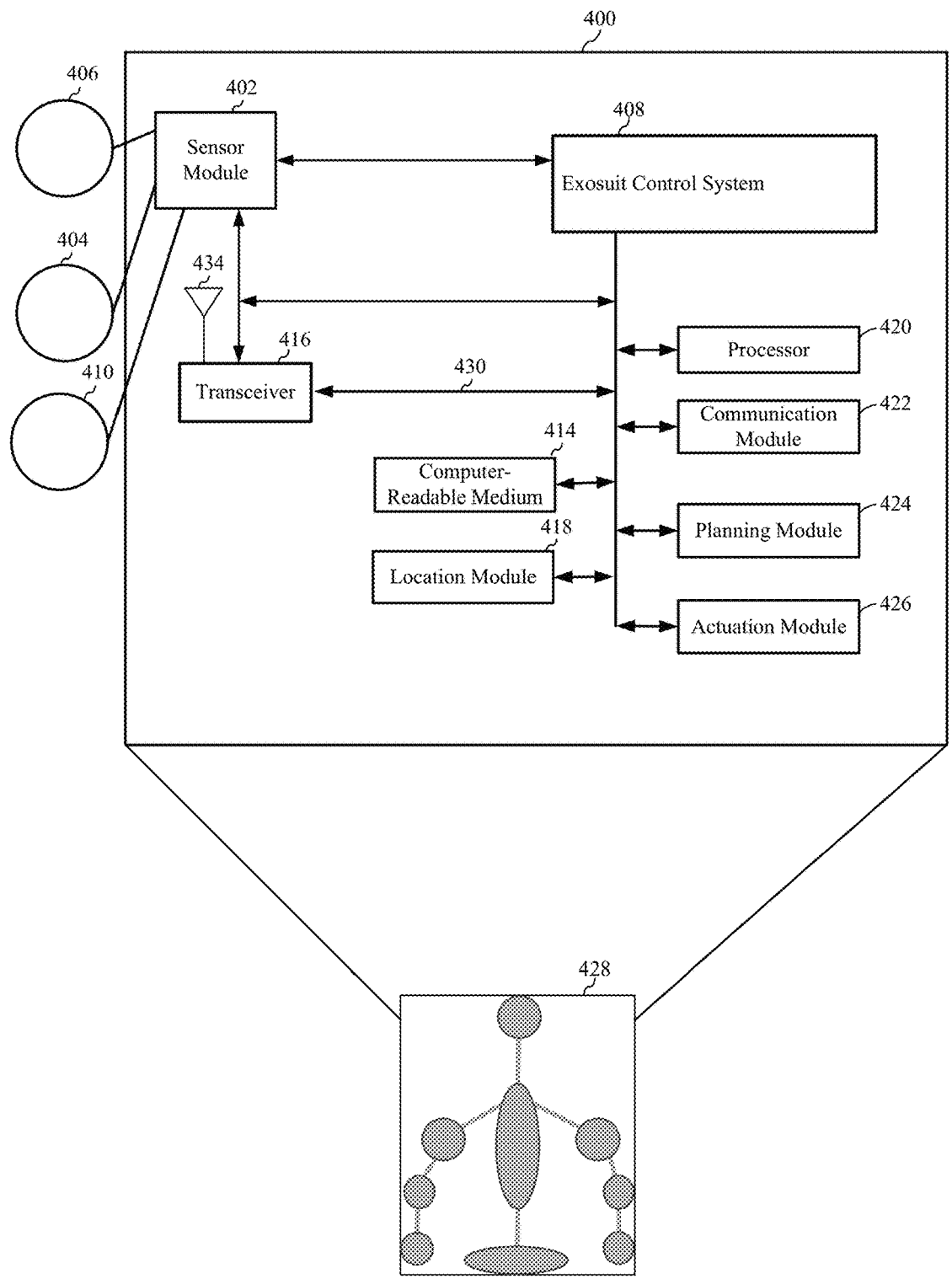
FIG. 4 is a hardware implementation of a wearable exosuit according to one aspect of the present disclosure.

FIG. 4 is a diagram illustrating an example of a hardware implementation for a fall prevention/protection system 400, according to aspects of the present disclosure. The fall prevention/protection system 400 may be a component of an exoskeleton, an exosuit, a garment, a robotic device, or other device. For example, as shown in FIG. 4, the fall prevention/protection system 400 may be a component of a wearable exosuit 428. Aspects of the present disclosure are not limited to the fall prevention/protection system 400 being a component of the exosuit 428, as other devices, including garments and other devices are also contemplated for using the fall prevention/protection system 400.

The fall prevention/protection system 400 may be implemented with a bus architecture, represented generally by a bus 430. The bus 430 may include any number of interconnecting buses and bridges depending on the specific application of the fall prevention/protection system 400 and the overall design constraints. The bus 430 may link together various circuits including one or more processors and/or hardware modules, represented by a processor 420, a communication module 422, a location module 418, a sensor module 402, an actuation module 426, a planning module 424, and a computer-readable medium 414. The bus 430 may also link various other circuits such as timing sources, peripherals, voltage regulators, and power management circuits, which are well known in the art, and therefore, will not be described any further.

The fall prevention/protection system 400 may include a transceiver 416 coupled to the processor 420, the sensor module 402, an exosuit control system module 408, the communication module 422, the location module 418, the actuation module 426, the planning module 424, and the computer-readable medium 414. The transceiver 416 is coupled to an antenna 434. The transceiver 416 communicates with various other devices over a transmission medium. For example, the transceiver 416 may send and receive commands via transmissions to and from a server or a remote device, such as a monitoring service. As another example, the transceiver 416 may transmit status, data, statistics and other information from the exosuit control system module 308 to a server (not shown).

The exosuit control system module 408 may include the processor 420 coupled to the computer-readable medium 414. The processor 420 may perform processing, including the execution of software stored on the computer-readable medium 414 providing functionality according to the disclosure. The software, when executed by the processor 420, causes the fall prevention/protection system 400 to perform the various functions described for a particular device, such as exosuit 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406, a second sensor 404, and a third sensor 410. The first sensor 406 may be a motion sensor, such as an accelerometer, gyroscope, inertial measurement unit, or the like. The second sensor may include a visual sensor, such as a stereoscopic camera, a red-green-blue (RGB) camera, LIDAR or RADAR. The third sensor 404 may be a health sensor, such as heart rate monitor, blood oxygen sensor, or the like. The health sensor may be configured to provide health information of the user after a fall to an ambulatory or health care provider via the transceiver 416 or communication module 422. Of course, aspects of the present disclosure are not limited to the aforementioned sensors as other types of sensors, such as, for example, thermal, sonar, and/or lasers are also contemplated for either of the sensors 404, 406, 410. The measurements of the sensors 404, 406, 410, 406 may be processed by one or more of the processor 420, the sensor module 402, the object tracking module 408, the communication module 422, the location module 418, the actuation module 426, the planning module 424, in conjunction with the computer-readable medium 414 to implement the functionality described herein. In one configuration, the data captured by the first sensor 406, the second sensor 304, and the third sensor 406 may be transmitted to an external device via the transceiver 416. The sensors 404, 406, 410 may be coupled to the exosuit 428 or may be in communication with the car 428.

The location module 418 may be used to determine a location of the exosuit 428. For example, the location module 418 may use a global positioning system (GPS) to determine the location of the exosuit 428. For example, the fall prevention/protection system 400 may be able to communicate with a remote monitoring service, such as an ambulatory service or other health service provider. If a fall is detected or triggered, the fall prevention/protection system 400 may transmit a location of the exosuit 428 allowing the service to easily locate and send assistance to the user.

The communication module 422 may be used to facilitate communications via the transceiver 416. For example, the communication module 422 may be configured to provide communication capabilities via different wireless protocols, such as Bluetooth, Wi-Fi, long term evolution (LTE), 3G, 5G, or the like. The communications module may also be configured to establish a communication channel between the user and a health care provider, such as a doctor, emergency room, or 911 operator. The communications module, upon detection of a severe injury or lack of vital signs, may establish communication with the health care provider through a connection with the user's phone, an on-board communications device or the like. The communication module 422 may also be used to communicate with other components of the exosuit 428 that are not modules of the exosuit control system module 408.

The actuation module 426 may be used to facilitate and control the actuation of the exosuit 428. As an example, the actuation module 426 may control movement of the limbs, core unit, waist unit, head/neck unit and/or other moveable components of the exosuit 428. As another example, the actuation module 426 may be in communication with a power source of the exosuit 428, such as a battery.

The fall prevention/protection system 400 may also include the planning module 424 for planning a response to a detected or potential fall and controlling the actuation of the exosuit 428, via the actuation module 426. The planning module 424 may include a set of instructions or settings that dictate how the exosuit 428 may respond when activated. For example, depending on the signals from any of the sensors 404, 406, 410, detailing the direction, speed, and orientation of the user's movement, the planning module may respond with a corrective or preventative action to prevent the fall or protect the user during the fall.

In one configuration, the planning module 424 may include or provide predicted responses to a fall pursuant to a profile or set of user preferences defined or set according to a health predisposition. For example, the exosuit 202, after or during a fall, may position the user in a position that allows them to easily get back up given a particularized profile such as landing on one's side or into a sitting position could be preferable to landing on one's back, due to a preexisting back injury. Similarly, if the user has a bad hip or previously hip injury, the planning module may define a profile configured to position the user, either during or after a fall, to avoid as much impact to the hip as possible, such as in a seated position or on their posterior. The planning module 424, as well as other modules described herein, may be software modules running in the processor 420, resident/stored in the computer-readable medium 414, one or more hardware modules coupled to the processor 420, or some combination thereof.

The exosuit control system module 408 may be in communication with the sensor module 402, the transceiver 416, the processor 420, the communication module 422, the location module 418, the actuation module 426, the planning module 424, and the computer-readable medium 414. In one configuration, the exosuit control system module 408 may receive sensor data from the sensor module 402. The sensor module 402 may receive the sensor data from the sensors 404, 406, 410. According to aspects of the disclosure, the sensor module 402 may filter the data to remove noise, encode the data, decode the data, merge the data, or perform other functions. In an alternate configuration, the exosuit control system module 408 may receive sensor data directly from the sensors 404, 406, 410.

As shown in FIG. 4, the exosuit control system module 408 may be in communication with the planning module 424 and the actuation module 426 to detect, analyze, and operate the exosuit 428 according to the perceived movements of the user. As described herein, the exosuit control system module 408 may analyze the data from the sensor module 402 and others to detect a fall, a potential fall, the position of the user, pre- or post-fall, or the health conditions of the user, as described herein.

Figure 5:
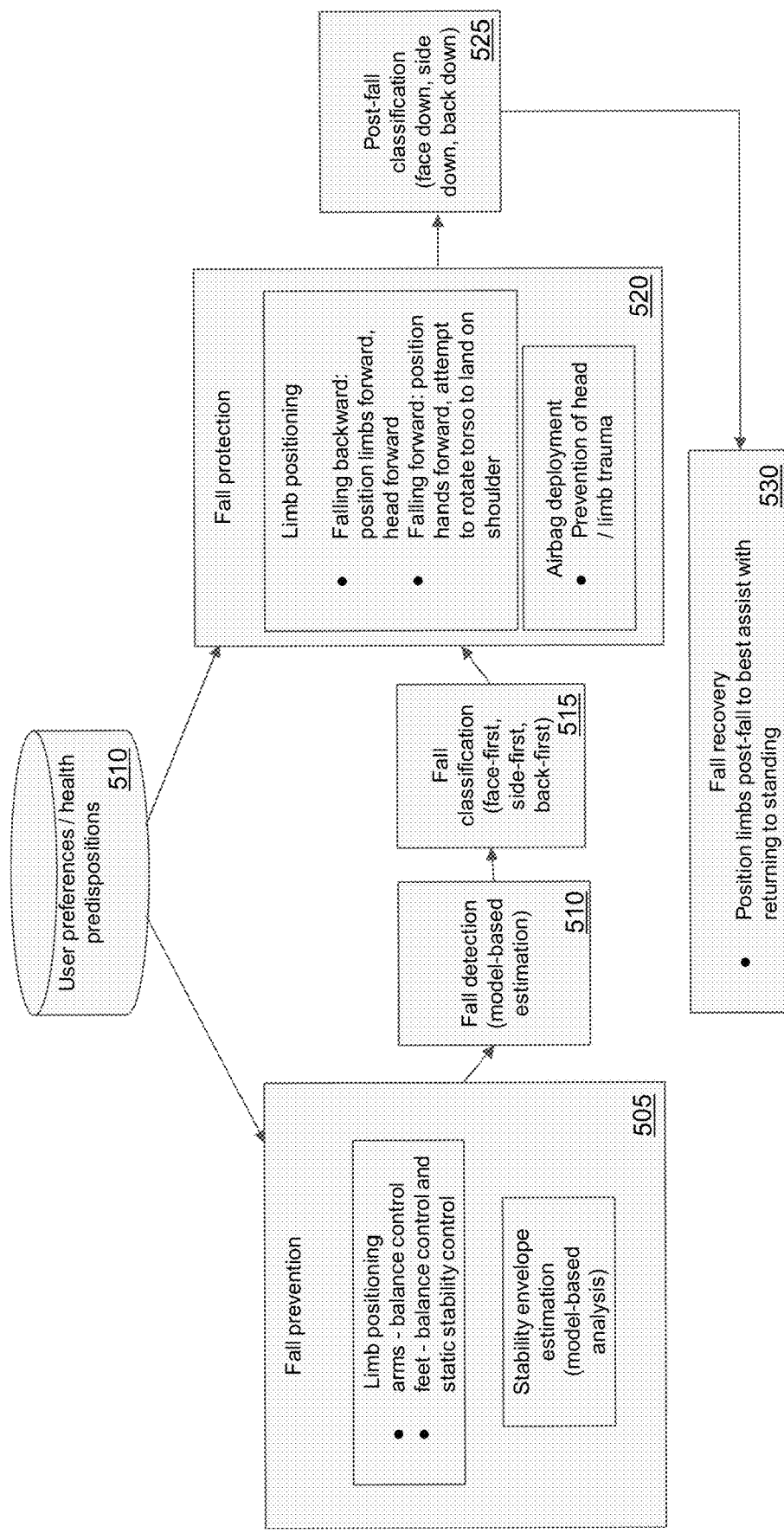
FIG. 5 is a flow diagram of a fall prevention/protection operation according to one aspect of the present disclosure.

FIG. 5 depicts a flow diagram 500 of a fall protection/prevention operation according to one aspect of the present disclosure. According to one aspect, the system may define a highly-personalized set of user-preferences and health predispositions, as shown in block 510. For example, the system may be personalized to a user with certain health conditions, age restrictions, or mobility limitations. Those limitations may be included in a user-profile that may dictate how the system will respond to a potential fall or actual fall. For example, a user with a bad or damaged hip may include a profile that informs the system to articulate the limbs and body of the user to avoid impacting that hip on the ground during a fall. Similarly, if a user has more strength in one arm or leg due to a known condition, the system may rely on that information to appropriately articulate the user's limbs to compensate for the lack of strength.

According to one aspect, the control system and/or planning module may determine whether to initiate a fall prevention operation, as shown in block 505, or a fall protection operation, shown in block 520. The fall prevention operation may dynamically adjust the user's limbs according to the onboard controller's sensing of inertial accelerations, joint positions and any external forces (or estimates of forces), to keep the user standing upright. The control system may be designed to optimize a cost function that takes into account maximal limb force exerted, maximum limb velocity, and joint limits to stabilize the user. This may require a coarse model of the user, and may account for counter-resistance to the suit's actuators via force sensors mounted on each limb on the suit itself. According to one aspect, the user may be treated as an unmodeled disturbance signal. This may also require sensors that measure joint angles and inertial measurement units (IMUs) to measure accelerations of the body. This control may be performed online using model-predictive control (MPC) or similar optimal control methods.

The fall prevention module may further include a stability envelope estimation. The stability envelope may include a model-based analysis that defines the conditions and boundaries of a stable state of the user. For example, the stability envelope may be based on the concept of zero-moment point. Zero-moment point specifies the point with respect to which dynamic reaction force at the contact of the foot with the ground does not produce any moment in the horizontal direction. It is the point where the total of horizontal inertia and gravity forces equals zero. According to one aspect, the zero-moment point may be used to keep a determined center of mass within a support polygon based on foot placement and other parameters. The zero-moment point concept may be extended to account for dynamic walking but at the expense of having to use more computationally-expensive methods. In measuring the stability envelope, for example with zero-moment point, there are parameters to be estimated, including the mass of the user, center of gravity, and acceleration of the center of gravity. Certain of the parameters may be wholly or partially determined by a user, for example by entering such information in an application. Other parameters may be estimated on-line.

The system may drive actuation of the exosuit in an attempt to keep the user within the stability envelope, thus preventing a fall. If, however, the system detects movement exceeding the boundaries of the stability envelope, a fall detection operation may be executed, as shown in block 510. The detection of a fall, beyond the departure from the stability envelope, may be defined by a model-based estimation given information from the sensors, including the acceleration, angles of movement, and direction of the user. This determination may also be based on zero-moment point as detailed above.

If a fall is detected, the system a fall classification operation, shown in block 515 may determine the type of fall occurring, according to a number of predefined fall classes, including without limitation, a face-first fall, a side-first fall, back-first fall, head-first fall, or the like. Once the fall is classified, the planning module may execute the fall protection operation, shown in block 520.

According to one aspect, during a fall protection operation, the system may adjust the limbs using the controller but rather than optimizing for stability, the control objective may be to optimize for impact intensity of various parts of the body. According to one aspect, the objective may minimize a cost which is a weighted sum of various terms, where each term considers the force of impact of a particular part of the body. For instance, the suit may aim to minimize the force at impact of the head, wrists, knees, back, chest, posterior, and shoulders, where the posterior would be given a smaller weight (hence preferred to take more force) and the head given a larger weight (hence preferred to take less or no force). Fall protection may require a model of a human falling, and may be solved using MPC.

The fall protection operation may define and control the limb positions to minimize any injury occurring from the fall. For example, if the user is perceived to be falling backward, the fall protection operation may instruct the system to position the arms and head forward. If the user is falling forward, the fall protection operation may instruct the system to position the hands forward and twist the torso of the user to land on a shoulder. Additionally, according to one embodiment, one or more airbags may be deployed to prevent injury.

According to one aspect of the present disclosure, the manner in which an exosuit device protects the user may be fine-tuned to a particular person via a phone or computer app. The user may be able to enter their age, weight, gender, disability, health conditions, including whether pregnant or not. When the user is falling or put in danger, the exosuit may respond in a way that would keep the user safe without over-stressing sensitive parts of the body, either from sudden movements and jerks caused by the suit or impacts from the fall itself. For instance, the system may protect an expectant mother by favoring landing on limbs over their torso. For an elderly person with osteoporosis, the suit may favor landing in a way that would reduce stress on bones, particularly the spine. The system may also take into account statistics related to injuries sustained from falls of a particular age group and then account for preventing the most debilitating ones in the fall protection cost function.

After performing fall prevention/protection operations, the system may execute a post-fall classification, as shown in block 525. According to one aspect, the system may determine the orientation of the user, e.g., face-down, side-down, back-down. Such a classification may be made in an effort to assist the user in a fall recovery operation, as shown in block 530. The system may position the limbs of the user in a position to best assist the user in recovering from the fall, whether it be returning to a standing position or turning to a safe position under further assistance arrives.

According to another aspect of the fall recovery operation, the system may execute one or more diagnostic procedures. The system may assess the impact to the suit by checking its own conditions and also the possible damage to the user by computing forces exerted on them during the fall. Additionally, the system, if necessary, may advise the user to see a doctor, or call 911 directly if it recognizes an emergency. According to another aspect, the system may contact the manufacturer to report its own damages for maintenance.

Figure 6:
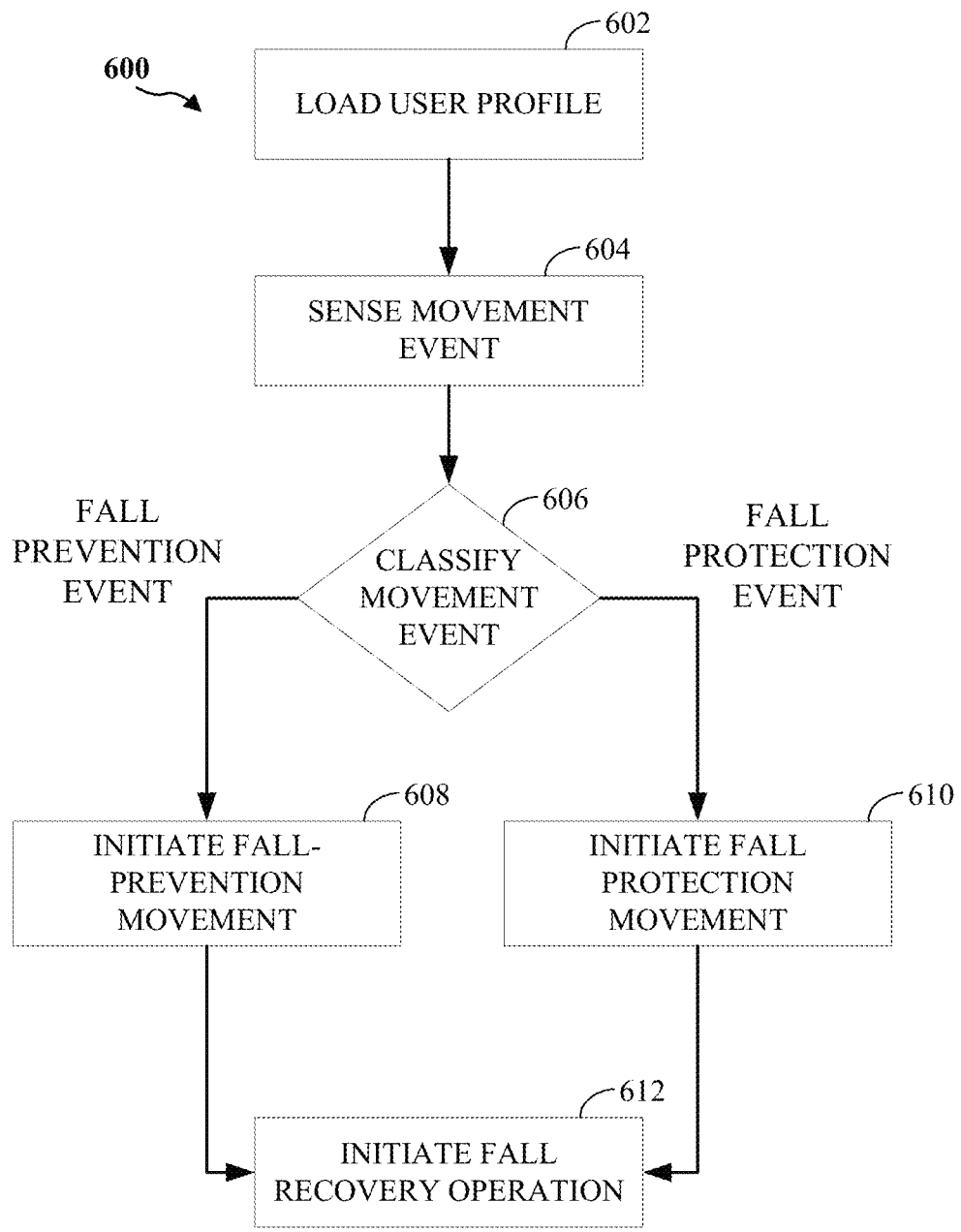
FIG. 6 is a flow diagram of a method for preventing an injury according to one aspect of the present disclosure.

According to another aspect of the present disclosure, a method of preventing an injury from a fall using an exosuit is provided. FIG. 6 is a flow diagram 600 of an exemplary method for countering a fall according to one aspect of the present disclosure. As shown in block 602 a user profile may be loaded by the exosuit. The exosuit, as described herein, may include memory for storing such a user profile and processing hardware and software to load the user profile. The user profile, according to one aspect may include user-specific information and parameters to be used by the exosuit in protecting the user when countering a fall event.

As shown in block 604, the exosuit may sense a movement event through one or more sensors coupled to a frame of the exosuit. As described herein, the sensors and exosuit processors may be configured to detect and determine a movement event based on the user profile and a stability envelope defining a normal body position of the user. If the sensed movement indicates movement that exceeds the stability envelope, the exosuit may classify the movement event according to one or more profiles, including for example, a fall prevention event or a fall protection event as shown in block 606. If the system classifies the movement as a fall prevention event, the system may initiate a fall-prevention movement to counter the movement event. For example, if the system determines that a user's movement indicates a high likelihood of a fall, but may be correctable, the system may initiate movement of the exosuit and one or more robotic joints of the exosuit to counter the movement and help the user reestablish balance and a stable position.

If the system classifies the movement event as a fall protection event, the system may initiate a fall protection movement, as shown in block 610. For example, if the movement event exceeds the stability envelope such that there is a certainty of a fall, the system may initiate a fall protection movement. As described herein, a fall protection movement may include the exosuit actuating one or more robotic joints of the exosuit to manipulate the user's body and limbs into a position that may minimize injury to the user during the fall. This may include raising the user's arms to avoid an injurious impact of the wrists, raising and bracing the user's head, or other such movements described herein.

After a fall prevention movement or a fall protection movement, as shown in block 612, the system may initiate a fall recovery operation. As described herein, a fall recovery operation may include positioning the user in a position to assist the user is getting up or wait for further assistance. It may also include transmitting a request and other information to a health service provider or other provider including a doctor, hospital, 911 operator, first responder or the like. Diagnostic and analytic information may be saved and transmitted to the manufacturer or other service provider.

While aspects of the present disclosure describe an exosuit to be worn by an elderly or disabled user, the disclosure is not so limited. For example, an exosuit system as described herein may be implemented for pedestrian safety. If the wearer crossing a street is in danger of colliding, or has already collided with a vehicle or other road, the exosuit may respond as described herein to minimize any injuries suffered by the impact.

As another example of a practical application of the disclosed system, in construction or factory environments, there is an opportunity to use the deployable airbags or strategic limb actuation o the exosuit to prevent or lessen injuries suffered from falls or collisions with moving parts or machines.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A wearable device comprising:
   a frame;
   at least one robotic joint operatively coupled to the frame;
   at least one sensor coupled to the frame, the sensor configured to sense a movement of the frame;
   a memory storing a user profile of a user, the user profile including a health condition;
   a controller coupled to the at least one robotic joint and the at least one sensor, the controller configured to:
      detect an event from the movement of the frame;
      classify the event as one of a fall prevention event or a fall protection event when the movement of the frame exceeds a stability envelope defining a normal body position of the user based on the user profile;
      in response to detecting a fall prevention event, actuate the at least one robotic joint to counter the movement of the frame; and
      in response to detecting a fall protection event, actuate the at least one robotic joint into a protected position.

2. The wearable device of claim 1 wherein actuating the at least one robotic joint comprises returning the frame to a stable position.

3. The wearable device of claim 1 wherein the stability envelope is estimated by a model-based analysis.

4. The wearable device of claim 1 further comprising an airbag coupled to the frame, the controller further configured to deploy the airbag upon detection of the event.

5. The wearable device of claim 1 wherein the frame comprises an exoskeleton configured to be worn by a user.

6. The wearable device of claim 5 further comprising a plurality of robotic joints coupled to the frame, each robotic joint corresponding to a joint to the exoskeleton.

7. The wearable device of claim 1 wherein the controller is further configured to:
   detect a second event from the termination of the movement of the frame;
   actuate the at least one robotic joint in response to the second event.

8. The wearable device of claim 7 wherein actuating the at least one robotic joint in response to the second event comprises actuating the frame into a recovery position.

9. The wearable device of claim 1 further comprising a communication device configured to transmit an alert upon detection of the event.

10. The wearable device of claim 1 wherein the controller is further configured to:
    detect the event and actuate the at least one robotic joint in response to the first event according to the user profile.

11. The wearable device of claim 10 wherein the user profile includes user-specific information related to a physical predisposition.

12. The wearable device of claim 11 wherein the physical predisposition includes a health condition.

13. The wearable device of claim 1 wherein the at least one robotic joint includes one or more of a shoulder joint, elbow joint, wrist joint, waist unit, knee joint, ankle joint, and head/neck unit.

14. A method of countering a fall by a user comprising:
    loading a user profile including one or more user preferences including a health condition;
    sensing a movement event by a sensor coupled to a frame;
    classifying the movement event according to data obtained from the sensor as one of a fall prevention event or a fall protection event when the movement of the frame exceeds a stability envelope defining a normal body position of the user based on the user profile;
    in response to detecting a fall prevention event, actuating a robotic joint coupled to the frame to counter the movement of the frame and;
    in response to detecting a fall protection event, actuate the at least one robotic joint into a protected position.

* * * * *